United States Patent Office 3,363,982
Patented Jan. 16, 1968

3,363,982
CATALYST FOR HYDROGEN PEROXIDE DECOMPOSITION
Herman J. Baumgartner, Danville, and George C. Hood, Orinda, Calif., and Donald D. Weaver, Houston, Tex., assignors to Shell Oil Company, New York, N.Y., a corporation of Delaware
No Drawing. Filed Apr. 8, 1964, Ser. No. 358,416
3 Claims. (Cl. 23—204)

ABSTRACT OF THE DISCLOSURE

An improved hydrogen peroxide decomposition process employs a silver catalyst wherein 10% to 90% of the surface of the silver is covered by zinc oxide.

---

This invention relates to the decomposition of hydrogen peroxide to produce steam and oxygen. It deals with new and improved catalysts for this decomposition.

Solid silver catalysts are generally considered the most advantageous among the numerous catalysts known to be effective in promoting the decomposition of hydrogen peroxide. These silver catalysts have had the disadvantage, however, of having only a relatively short, effective life due to their rapid loss of silver during use. This is an especially serious problem in reaction motors, control devices for rockets, and the like, where it is highly desirable to use the smallest possible amount of hydrogen peroxide decomposition catalyst yet insure a long, effective life in repeated use.

An important object of the invention is to provide a solid silver catalyst for hydrogen peroxide decomposition which has a longer, effective life than the previously available catalysts. Another object is the provision of a new method of treating silver hydrogen peroxide decomposition catalyst so as to make their surface more resistant to loss during use in the decomposition reaction. Still another is to provide a new method of hydrogen peroxide decomposition by use of these new decomposition catalysts in which the amount of peroxide decomposed per unit weight of silver lost is greatly increased over that obtainable with previously available catalysts. Still other objects and advantages of the invention will be apparent from the following description of some of its advantageous modifications which are intended only as illustrations of the principles on which the invention is based and hence are not limitative of the invention in its broader aspects.

According to the present invention, improved catalysts for hydrogen peroxide decomposition comprise solid silver compositions having a surface containing an oxide of a fixed valent metal of the right-hand column of Group II of Mendeleeff's Periodic Table of the Elements with an atomic number of at least 30 in an amount such as to cover at least 10%, but not more than 90% of the silver surface. Especially useful catalysts are those which have about 20 to 80% of the silver surface covered with zinc or cadmium oxide. Catalysts of this kind are capable of decomposing much greater amounts of hydrogen peroxide per unit weight of silver lost than are the prior solid catalysts with an all silver surface.

The new catalysts of the invention can be produced in a number of different ways. In the following description of some of the suitable methods for producing these catalysts, the manufacture of silver catalysts containing zinc and/or cadmium oxide on the surface will be emphasized because of the special advantages of these new catalysts. One convenient method of production is to immerse conventional silver catalyst in a solution of a suitable zinc or cadmium compound in a volatile solvent until the required amount of zinc and/or cadmium has been absorbed. The silver surface is preferably treated with acetone, degreased with benzene, and chemically polished, as by treatment with potassium cyanide in dilute hydrogen peroxide and baked at about 400° to 700° C. for several hours to improve adsorption before immersion in the calculated amount of solution of zinc and/or cadmium compound. Aqueous solutions having a concentration of zinc and/or cadmium compound between about $\frac{1}{10}$ saturated and saturated at the operating temperature are useful. After adsorption of the required amount of solution which generally requires only about 5 to 30 minutes immersion although longer periods can be used, the catalyst is drained and the solvent is removed by suitable heating. The compound thus deposited on the silver surface can then be converted to zinc and/or cadmium oxide in any suitable manner. The zinc and/or cadmium compound used should be one which does not introduce catalyst poisons in amounts which will have an undesirable effect upon the peroxide decomposition. Water-soluble zinc or cadmium salts such as the nitrates or lower carboxylic acid salts such, for example as the formates, acetates, etc., are particularly useful when employing water as the solvent. By the use of alcohols or other organic solvents, one can use higher carboxylic acid salts, but as a rule this method does not offer sufficient advantage over the use of water-soluble salts of zinc and cadmium to warrant the increased expense which is usually involved. The treatment which is required for converting the deposited salt to oxide will depend upon the particular zinc or cadmium salt involved. Thermal decomposition is usually suitable but can be combined with oxidation or other known methods of forming the required oxides. While it is preferred to carry out the conversion of the deposited salt to oxide prior to use of the catalyst for hydrogen peroxide decomposition, this is not always necessary. When the preferred carboxylic acid salts or nitrates, no special treatment of the catalyst to convert the salt to zinc and/or cadmium oxides is necessary before use of the catalyst for hydrogen peroxide decomposition because this conversion will take place immediately upon such use of the catalyst due to the high temperature which is generated in the decomposition. It is for this reason that silver catalysts which have on their surface zinc and/or cadmium compounds which are precursors of the oxides of these metals under hydrogen peroxide decomposition conditions are a valuable part of the invention and are usable in the same way as the new zinc and/or cadmium oxide-containing silver catalysts when the same proportion of the catalyst surface is covered therewith.

In another suitable process for incorporating the required amount of zinc and/or cadmium oxide into the active surface of the silver catalyst, a suitable zinc and/or cadmium compound is distributed throughout the silver catalyst or at least in the upper portion thereof. One method for producing such catalysts is to apply to a screen or other support a mixture of silver and zinc and/or cadmium oxides in proportions such that the exposed surface will have the previously indicated percentages of silver and said oxide or oxides. The required mixture can be applied conveniently as a suspension of the finely divided solids in a liquid, preferably a liquid which can also act as a binder to hold the solids on the support at least until suitable treatment is carried out to effect the required adherence of the solids to the support. Suspensions in paint or lacquer vehicles having suitable drying rates are effective. These can be applied by dipping, or the like, and the catalysts can be afterward heated to bring about sintering with formation of a strong, adherent coating on the support. Such catalysts can also be made in the same way omitting the carrier, and will then usually be in granular form.

Still another method for producing the new catalysts makes use of electrolytic deposition of zinc and/or cadmium upon a silver catalyst in controlled amount so that upon subsequent oxidation 10 to 90% of the silver surface will be covered by zinc and/or cadmium oxide. Alternatively the zinc and/or cadmium can be deposited simultaneously with silver in the proportions which produce a catalytic surface which after oxidation contains 10 to 90% of zinc and/or cadmium oxide thereon. For the electroplating of zinc or cadmium, one can use solutions of the sulfates or other soluble salts. Preferably small amounts of glue, dextrine, or like organic agents which yield a plating of finer grain are used in the plating bath. Fairly strong solutions of the double cyanide of silver and potassium or sodium such as are frequently used in conventional plating of this metal are one example of the silver solutions which can be used with solutions of zinc and/or cadmium in carrying out this modification of the catalyst production method of the invention.

A less preferred alternative method of making the catalysts comprises spraying or spattering molten zinc or cadmium upon a silver catalyst surface in the proportions indicated above. It is usually difficult to control the distribution of the metal in these methods of operation, however. Such control can often be obtained more easily by regulated dipping of the silver catalyst in molten zinc and/or cadmium so as to cover only a part of the silver surface.

Instead of producing the new catalysts by forming zinc and/or cadmium oxide upon a silver catalyst surface as above described, one can make these catalysts by a more or less reverse procedure in which a surface of zinc and/or cadmium and/or their oxides is treated to apply silver thereto in an amount such that the final catalyst surface will have 10 to 90% of its area covered by zinc and/or cadmium oxide. Zinc and/or cadmium in the form, for example, of sintered porous metal, or as a porous deposit upon a carrier can be oxidized with air or hydrogen peroxide or other suitable agents to form an oxide surface thereon and then immersed in a solution of a silver salt, for instance the nitrate, to absorb sufficient silver salt to provide a silver surface covering 10 to 90% of the area of the oxides after conversion of the silver salt to silver.

In most of the foregoing methods, the new catalysts produced will have only a relatively thin surface layer of the zinc and/or cadmium oxides essential for the improved results of the invention in contact with the catalytic silver surface. This layer is subject to loss through erosion by the decomposing hydrogen peroxide and/or its decomposition products during use of the new catalysts. It is a feature of the invention in one of its advantageous modifications to provide composite catalysts containing means for maintaining the required proportion of zinc and/or cadmium oxide to silver on the catalyst surface in spite of such erosion losses. One convenient method of constructing such composite catalysts is to intersperse suitable sources of zinc and/or cadmium oxide with the new silver catalysts which have one or both of these oxides on their surface in the previously indicated required amount. The source of the oxide or oxides is arranged so that as the zinc and/or cadmium oxide is lost from the catalyst surface, it is continually replaced on the silver surface. One simple way of accomplishing this uses zinc and/or cadmium metal as the source of these oxides. For instance, one or more screens having a zinc and/or cadmium surface can be used together with screens which have surfaces made up of the catalyst mixture of the invention. The zinc and/or cadmium metal screens are positioned upstream in the hydrogen peroxide flow so that erosion from their surface will supply zinc and/or cadmium which will deposit upon the catalyst surface as oxide. In this way, the oxide lost from the silver is replaced and the desired activity and long, effective life of the catalyst is maintained.

Depending upon the size of the catalyst bed, one or more such screens with a zinc and/or cadmium surface can be positioned at intervals within the bed in addition to being placed at the inlet of the bed. The locations which will supply the needed oxides at the required rate are readily determined in a trial decomposition run conducted at the desired hydrogen peroxide feed rate. The rate of deposition of zinc and/or cadmium oxide on the silver catalyst can be controlled by adjustment of the area of these metals which is exposed to the hydrogen peroxide stream. A larger exposed metal area will supply a greater amount of deposited oxide at a given hydrogen peroxide feed rate, and a higher feed rate will result in increased metal removal from a given area of exposed zinc and/or cadmium. Thus, when using metal wire screens, for example, as the source of the zinc and/or cadmium oxide intended for replacement of that lost from the silver surface, one can control the rate of supply of oxide by choice of the diameter of the wires and the mesh of the screen in relationship to the hydrogen peroxide feed rate which is used. The rate of metal loss is readily determined for different feed rates by a simple test in which the screen is weighed before and after passage of the peroxide therethrough under the planned operating conditions. In operation according to this modification of the invention, it is not necessary to start with a silver catalyst having the required amount of zinc and/or cadmium oxide on the surface thereof since this oxide can be supplied at the beginning of hydrogen peroxide decomposition from a source of zinc and/or cadmium oxide such, for example, as has been described above for maintaining these oxides on silver catalysts initially provided therewith.

The following examples further illustrate some of the suitable methods of carrying out the invention.

*Example I*

Tests were carried out comparing a conventional silver catalyst with catalysts having different amounts of zinc oxide on the silver surface. The composite catalysts were prapered by dipping silver rod into a saturated zinc nitrate solution to take up different amounts of zinc nitrate, drying at ambient temperature, and heating to convert the nitrate to zinc oxide. The dynamic tests were carried out which determined the rates of hydrogen peroxide decomposition and of loss of catalyst at the inlet of a hydrogen peroxide decomposer using a silver catalyst. The liquid 90% wt. hydrogen peroxide feed was pressured from a 347 stainless-steel tank with nitrogen through an automatic valve controlled by a Pedersen automatic feed rate balance using a flow rate of 45 grams of the hydrogen peroxide per minute. The feed hydrogen peroxide was heated to reaction temperature in a section of $\frac{1}{8}$-inch stainless-steel tubing immersed in a water bath. After contacting the catalyst in the form of a pure silver rod $\frac{1}{4}$-inch long and $\frac{1}{8}$-inch in diameter into which a thermocouple was silver soldered, the effluent was passed through a cooler, back pressure regulator, and gas-liquid separator. The average of the temperatures of the hydrogen peroxide stream measured with thermocouples just before and after the silver catalyst was 255° C. during the test which was carried out at 300 p.s.i.a. The loss of catalyst was determined by accurate weighing of the silver specimen before and after the test which was carried on for 30 minutes. The following are the results of typical runs:

| Catalyst Surface | $H_2O_2$ Decomposition Rate (moles $H_2O_2$ decomposed per sq. cm. catalyst surface, minute) | Decomposition Efficiency (moles $H_2O_2$ decomposed per gram of silver lost) |
| --- | --- | --- |
| Pure silver | 0.078 | 460 |
| Silver having zinc oxide on its surface | 0.122 | 535 |
| Do | 0.160 | 760 |
| Do | 0.184 | 1,040 |
| Do | 0.185 | 1,230 |

These results show the improvement obtained with catalysts having amounts of zinc oxide within the previously indicated suitable range.

Example II

When the silver catalyst is dipped in aqueous cadmium nitrate solutions and then dried and the nitrate decomposed to obtain catalysts having about 8.2 to 12.4 mg. of cadmium oxide per square centimeter of silver surface are tested in the same ways as in Example I, substantially increases in hydrogen peroxide decomposition rate coupled with significant improvements in decomposition efficiency are similarly obtained compared with operation with a pure silver catalyst under the same conditions.

Example III

In a Naval Air Rocket Test Station hydrogen peroxide decomposition evaluator of ⅝-inch diameter which is a scaled-down rocket motor having a bed of silver screens as the catalysts, the improvements in decomposition rate and decomposition efficiency shown in Example I can be obtained by positioning at the feed end of the silver catalyst bed zinc and/or cadmium screens having an area which provides deposition of between about 0.5 and about 1.5 milligrams of zinc oxide and/or cadmium oxide per square centimeter of silver surface area of the catalyst. At a hydrogen peroxide feed rate of 18 pounds of 90% solution per square inch of bed per minute, and a chamber pressure of 300 pounds per square inch, greatly improved operation is obtained compared with operation without the metal screens.

It is a feature of the invention that the method of Example III can be employed to supply to the catalyst other activators than the zinc and/or cadmium oxide previously indicated as preferable in the new silver catalysts. Thus, by feeding the hydrogen peroxide to be decomposed through a body of any suitable activator of peroxide decomposition so as to pick therefrom sufficient activator to keep the surface of the solid silver decomposition catalyst through which the peroxide is then passed supplied with activator on 10% to 90%, preferably about 20% to about 70% of its area, the same improved catalyst operation can be achieved as when operating with silver catalyst whose surface has been pretreated to provide the same amount of the same activator thereon. Among the activators which can thus be used in addition to or as substitutes for zinc and cadmium oxides are, for example, the oxides of nickel, yttrium, the rare earths, especially those having atomic numbers 57 through 71, for example, lanthanum, cerium, samarium, europium, gadolinium, neodymium, dysprosium, erbium, ytterbium, and the like. Typical of the results which can be obtained by the use of fine nickel wires ahead of the silver catalyst are those of the following example in which such operation was simulated.

Example IV

The test method was the same as Example I conducted so that the silver catalyst was supplied with about 1.5 milligrams of nickel per square centimeter of silver surface, the nickel being in oxide form. The following results were obtained in decomposing 90% hydrogen peroxide fed at the rate of 45 grams of solution per minute.

| Catalyst | $H_2O_2$ Decomposition Rate (moles $H_2O_2$ decomposed per sq. cm. catalyst surface, minute) | Decomposition Efficiency (moles $H_2O_2$ decomposed per gram of silver lost) |
| --- | --- | --- |
| Pure silver | 0.078 | 460 |
| Silver activated by nickel oxide | 0.123 | 700 |

While the improvement of pure silver catalysts by the method of the invention has been emphasized in the foregoing examples, it will be understood that the invention is not limited thereto since one can also use alloys or mixtures of metallic silver with other metals which may or may not be themselves catalysts for hydrogen peroxide decomposition. Alloys of silver with a minor amount of other catalytic metal are particularly useful. Among the other catalytic metals which can be used with silver catalysts are, for instance, precious metals such as, platinum, palladium, rhodium, iridium, osmium, and the like.

The silver catalyst or silver catalyst-containing mixture used for hydrogen peroxide decomposition according to the invention can be employed in any of the customary forms. They can, for example, be used in the forms of screens, perforated plates, or the like, which can be superimposed on each other to make a fixed bed through which the hydrogen peroxide can be passed without excessive pressure drop. United States Patent 2,865,721, for example, described suitable catalyst bed assemblies containing silver catalysts which can be used in the process of the present invention. Beds of granular or other porous forms of silver-containing decomposition catalyst can also be used.

While it is a special advantage of the process of the invention that the decomposition of the hydrogen peroxide can be initiated at low, initial temperatures, this is not essential for successful operation which can be carried out with hydrogen peroxide at any temperature and pressure at which the peroxide feed is in the liquid state. Feed temperatures of the order of about −20° to about 100° C. and operating pressures of atmospheric to about 100 atmospheres are generally suitable, but other operating conditions can also be used.

The source of the hydrogen peroxide which is decomposed is not important in the new process which can be carried out successfully with hydrogen peroxide from any source. The new method has been used with hydrogen peroxide of different kinds and can be advantageously employed with hydrogen peroxide from organic sources, such, for instance, as the oxidation of alkyl anthraquinones, or alcohols, or hydrocarbons, or hydrazobenzenes, for example, as well as with electrolytic hydrogen peroxide. The hydrogen peroxide decomposed preferably has a concentration of at least 30% by weight and more advantageously is concentrated hydrogen peroxide of 80% wt. strength or higher, most preferably about 90 to 100% wt. concentration.

Still other variations can be made in the new catalysts and methods of the invention which is also not limited to the modifications disclosed by way of illustration or by any theory proposed in explanation of the improved results which are obtained.

We claim as our invention:
1. A method of decomposing hydrogen peroxide which comprises contacting the hydrogen peroxide with a catalyst having a surface of silver between 10% and 90% of the area of which is covered by zinc oxide.

2. In silver-catalyzed decomposition of hydrogen peroxide, the method of increasing the activity of the silver catalyst and reducing loss of silver therefrom which comprises supplying to the catalyst during said decomposition sufficient zinc oxide to maintain 10% to 90% of the silver surface covered with said oxide.

3. A method in accordance with claim 2 wherein the zinc oxide is supplied by contacting hydrogen peroxide to be decomposed with metallic zinc to remove therefrom sufficient zinc to form said oxide.

References Cited

UNITED STATES PATENTS

| 2,369,912 | 2/1945 | Pfleiderer et al. | 23—207 |
| 2,721,788 | 10/1955 | Schad | 23—204 |
| 2,865,721 | 12/1958 | Lane et al. | 23—221 |

OTHER REFERENCES

Schumb et al.: "Hydrogen Peroxide," Reinhold Publishing Corporation, New York, N.Y., 1955, page 468.

OSCAR R. VERTIZ, *Primary Examiner.*

H. S. MILLER, *Assistant Examiner.*